(No Model.) 2 Sheets—Sheet 1.
R. E. SHILL.
APPARATUS FOR SEPARATING PRECIOUS METALS BY AMALGAMATION FROM ORES OR MATERIALS CONTAINING THEM.
No. 470,921. Patented Mar. 15, 1892.
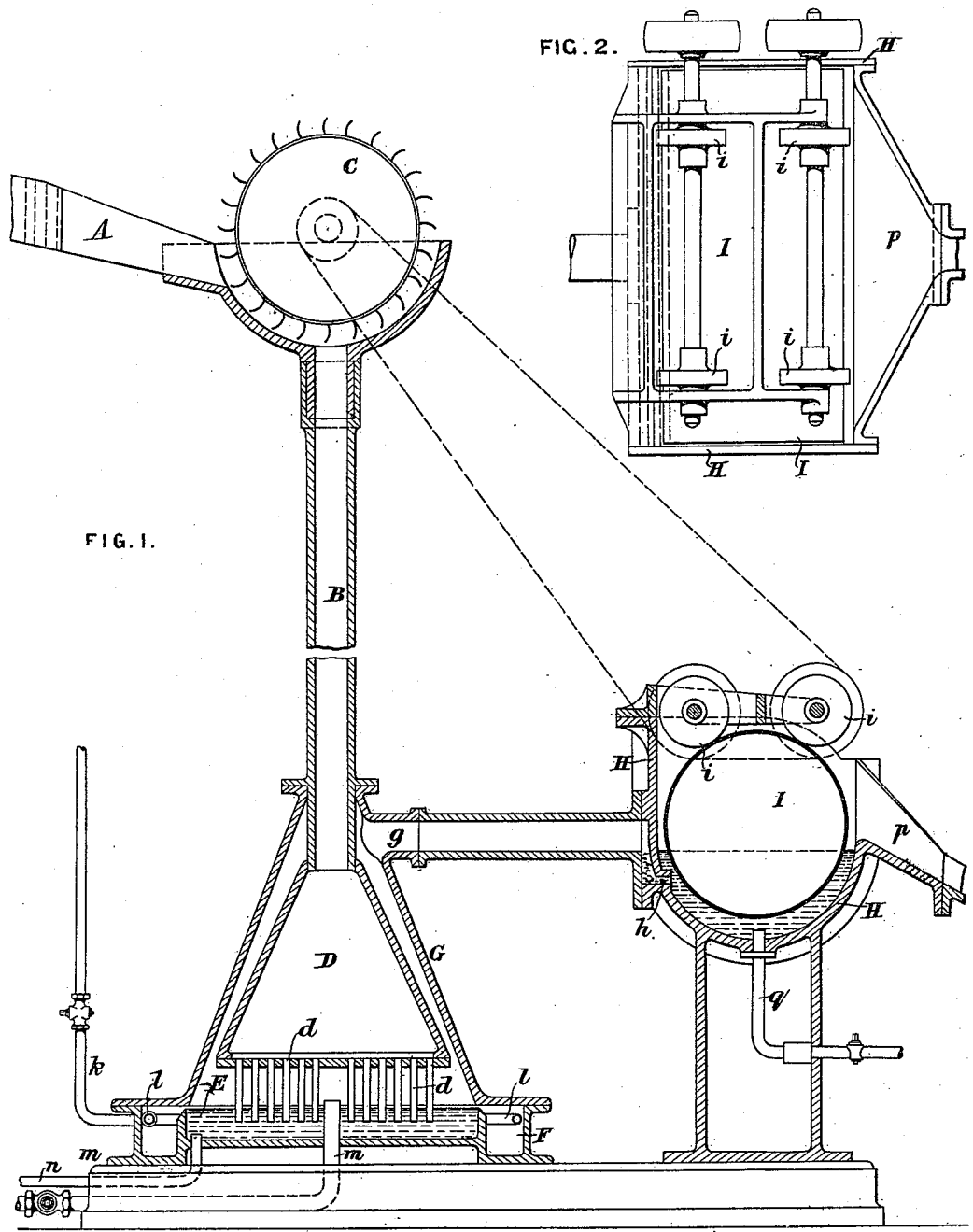

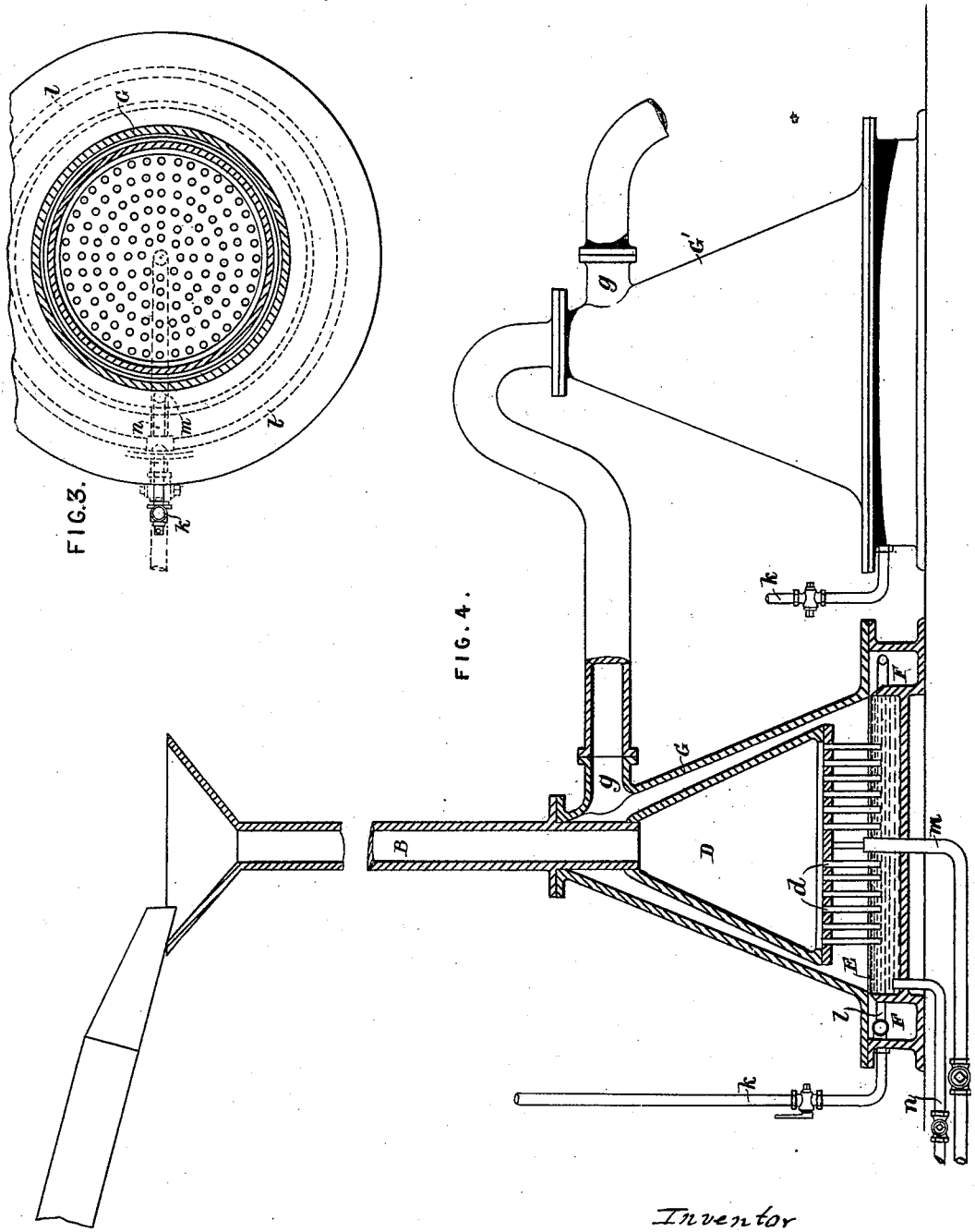

UNITED STATES PATENT OFFICE.

RICHARD E. SHILL, OF LONDON, ENGLAND.

APPARATUS FOR SEPARATING PRECIOUS METALS BY AMALGAMATION FROM ORES OR MATERIALS CONTAINING THEM.

SPECIFICATION forming part of Letters Patent No. 470,921, dated March 15, 1892.

Application filed July 18, 1890. Serial No. 359,149. (No model.) Patented in England December 12, 1889, No. 20,017, and in France June 11, 1890, No. 206,295.

*To all whom it may concern:*

Be it known that I, RICHARD EDMUND SHILL, engineer, a subject of the Queen of Great Britain and Ireland, and residing at 37 Worlingham Road, East Dulwich, London, in the county of Surrey, England, have invented certain Improvements in Apparatus for Separating Precious Metals by Amalgamation from Ores or Materials Containing Them, (for which I have applied for patents in Great Britain on December 12, 1889, No. 20,017, and in France on June 11, 1890, No. 206,295,) of which the following is a specification.

My invention relates to means whereby precious metals are recovered from ores or materials containing them by the aid of mercury. I will describe it as applied to the separation of gold. As such apparatus has hitherto been arranged the finer gold has not been recovered commercially, owing mainly, I believe, to its not penetrating the film on the upper surface of the mercury.

According to my invention I provide in connection with amalgamating apparatus means whereby the finely-divided ore or material containing the gold is discharged in a number of small streams or finely-divided portions into mercury below the surface thereof. I may effect this in various ways. For instance, I may provide a vessel down through or into which passes a pipe or passage having at its lower end a conical or equivalently shaped vessel carrying in its base a number of outlet passages or pipes which dip into mercury contained in a chamber constituting a detachable bottom of the apparatus. This conical vessel may be rotated in an outer vessel or it may be stationary. Its rotation may be effected by the passage of the pulp or ground material thereinto with the assistance of water or liquid, if desired, or by any suitable motor. The said conical vessel may also carry amalgamated plates above the mercury in the outer vessel to intercept any gold which might possibly otherwise pass off; but I do not consider that these amalgamated plates will be necessary in practice. There may also be provided around the mercury-chamber an annular trough or the like for receiving the sulphurets or concentrates, the said trough being provided with means for supplying a current of water with a force sufficient to prevent the gangue or refuse passing thereinto, but not sufficient to prevent the sulphurets or concentrates entering therein. The free or float gold contained in the pulp or crushed ores or materials precipitates in the mercury the remaining material after it has passed through the mercury rising and any sulphurets or concentrates passing into the aforesaid trough, the gangue or refuse passing off at an outlet; or it may pass out into another similar vessel or similar vessels, preferably at a lower level, so that the materials pass thereinto by gravity. To insure the complete separation of any gold which may pass over from the first vessel, the apparatus is provided with water inlets and draw-offs and also with outlets by which the mercury can be removed, as desired.

In order that my said invention may be fully understood, I shall now proceed more particularly to describe the same, and for that purpose shall refer to the several figures on the annexed drawings, the same letters of reference indicating corresponding parts in all the figures.

Figure 1 of the accompanying drawings represents in vertical section an apparatus constructed or arranged according to my invention. Fig. 2 is a plan of a portion of the same, and Fig. 3 is a horizontal section of another portion thereof. Fig. 4 represents a side view, partly in vertical section and partly in elevation, of two vessels of substantially the same kind in Fig. 1, when united or connected for a continuation or repetition of the amalgamating process.

A is a chute, down which the finely-ground ore or material to be treated is conducted into a pipe or passage B, leading to a conical vessel D, the base of which is provided with a number of tubes or outlet pipes *d*, dipping into mercury contained in a chamber E, situated at a short distance below the base of the conical vessel D, and surrounded by an annular trough F, into which the sulphurets or concentrates are caused to enter, as hereinafter described. The conical vessel D is surrounded by a conical casing G, provided at its upper part with an outlet $g$, which may lead the gangue or refuse passing therefrom into another vessel G', of the same kind as shown in Fig. 4; or it may be conducted through a number of small openings $h$, (one of which is shown in Fig. 1,) in the form of finely-divided streams, which are caused to enter the mercury (below the surface thereof) contained in the lower part of a vessel H, containing a copper drum I, which floats on the mercury and is rotated by means of friction-wheels $i$ bearing on its upper part. The said friction-wheels $i$ may be driven, as shown, by a band from a pulley mounted on the axle of a small bucket-wheel C, which is driven by the force of the crushed material passing from the trough A into the pipe B, thereby obviating the necessity for special motive power for driving the drum. The ore or material to be treated with the necessary amount of water to form a pulp is fed into the chamber D, and passes by the pipes $d$ in a number of small or finely-divided streams to beneath the surface of the mercury in the chamber E, and the free or float gold is retained or deposited therein. The small streams of pulp passing through the pipes $d$ cause a number of ripples equal to the number of pipes $d$ to be produced on the surface of the mercury, which ripples cause the sulphurets or concentrates to be worked, after the manner of a "Frue vanner," toward and over the outer edge of the chamber E into the trough F, in which they deposit by gravity, while the gangue or particles of lighter specific gravity pass with the water up the space between the vessels D and the outer casing G, within which it is inclosed, and out by the outlet $g$, to be further treated or not, according to whether or not there be any gold still remaining in the gangue or refuse material. If it is to be further treated, it may pass from the casing G into a similar vessel, as shown in Fig. 4, or, if desired, into several such vessels, one succeeding the other; or it may be passed into the vessel H, as aforesaid, and, as shown in Fig. 1, so that any gold contained in the gangue or refuse will be taken up by the cylinder I and deposited in the mercury contained in the vessel H. Water is admitted to the annular trough F by a pipe $k$, communicating with a coil $l$, arranged near the top of the trough and provided with perforations arranged at a suitable angle to cause the water passing through the perforations to act on the gangue to prevent the lighter portions thereof entering the said trough. When the material has been sufficiently treated, the refuse material remaining may be withdrawn or discharged from the apparatus by a pipe $m$, passing through the bottom of the chamber E and projecting above the surface of the mercury, as shown, after which the mercury may also be extracted from the chamber E by a pipe $n$, which passes through and projects above the bottom of the chamber. The refuse material and the mercury having been withdrawn, the chamber E may be detached from the casing G, which, together with the vessel D, may then be elevated; or the chamber E may be drawn away from beneath them and the gold and other deposits be removed from the chamber E and trough F by any suitable means. The refuse material passes from the vessel H by a spout $p$, and the mercury may be discharged from the said vessel, when required, by the pipe $q$.

It will be understood that either of the two apparatus shown in Fig. 1 may be used, either together or one without the other. If that with the rotating cylinder be used alone, then the chute or guide B will be led down directly to the outlets $h$.

Having now particularly described and ascertained the nature of my said invention and in what manner the same is to be performed, I declare that what I claim is—

1. In an apparatus for separating precious metals from ores or materials containing them, the combination of a conical vessel provided at its apex with an inlet for the passage of the ore and provided in its base with a series of tubes, pipes, or outlets extending below the same, a similar vessel surrounding said conical vessel and leaving a space between the two, a chamber situated below the said vessels and surrounded by a trough, a perforated water-coil located in said trough and provided with an inlet, a refuse-discharge, and a discharge for the mercury, substantially as described.

2. In an apparatus for separating precious metals from ores or materials containing them, the combination of the vessel H, semicircular or concave in form and provided with a refuse-discharge spout and a mercury-discharge pipe, finely-divided passages leading into said vessel, and a rotating copper cylinder located in said vessel, substantially as described.

3. In an apparatus for separating precious metals from ores or materials containing them, the combination of the two conical vessels, the inner one of which is provided with a series of tubes or passages extending below its base, the chamber and its surrounding trough, together with the water-coil and the several discharge-tubes, the concave vessel communicating with the outer conical vessel through a series of finely-divided passages, a refuse-discharge and a mercury-outlet for said concave vessel, and a rotating copper cylinder located therein, substantially as shown and for the purpose described.

In testimony whereof I have signed my name to this specification in the presence of two subscribing witnesses.

R. E. SHILL.

Witnesses:
 CHAS. MILLS,
 47 *Lincoln's Inn Fields, London.*
 WILLIAM F. UPTON,
 47 *Lincoln's Inn Fields, London, W. C.*